United States Patent [19]

Erickson et al.

[11] 4,193,671

[45] * Mar. 18, 1980

[54] IDENTIFYING MEANS FOR POLYMERIC CONTACT LENSES

[75] Inventors: Charles E. Erickson, Bellevue; Amar N. Neogi, Seattle, both of Wash.

[73] Assignee: Precision Cosmet Corp., Minneapolis, Minn.

[*] Notice: The portion of the term of this patent subsequent to Oct. 24, 1995, has been disclaimed.

[21] Appl. No.: 962,058

[22] Filed: Nov. 20, 1978

[51] Int. Cl.² .............................................. G02C 7/04
[52] U.S. Cl. .................................. 351/160 H; 351/162
[58] Field of Search ................ 351/160 R, 160 H, 162

[56] References Cited

U.S. PATENT DOCUMENTS 3,454,332  7/1969  Siegel ..................................... 351/162
4,121,885  10/1978  Erickson et al. ................... 351/160 X Primary Examiner—John K. Corbin
Assistant Examiner—Scott J. Sugarman
Attorney, Agent, or Firm—David L. Garrison

[57] ABSTRACT

A method for providing hydrophilic contact lenses with identifying means incorporated into lens blanks and the resulting lenses in which an elongated identifying strand, fiber, or rod is molded into a cylindrical lens blank rod positioned substantially parallel to the axis of the rod. Lens blanks or buttons are cut transversely to the axis and the lens blanks ground to the proper optical curvatures. The contact lens blanks each contain portions of the identifying means. The finished contact lenses each contain short segments of the identifying means thereby allowing classification of the contact lenses as to right or left eye, magnification power or other characteristic.

11 Claims, 5 Drawing Figures

IDENTIFYING MEANS FOR POLYMERIC CONTACT LENSES

BACKGROUND OF THE INVENTION

This invention relates to the manufacture of polymeric contact lens structures wherein the structure is produced with an identifying means comprising short segments of elongated strand, rod or fiber indicia molded into the structure during manufacture.

This invention further relates to contact lens manufacture wherein a lens is produced having a gradation or variation in physical properties from the central portion to the peripheral skirt portion of the lens and has means for identifying the lens incorporated into the lens during manufacture.

This invention also relates in one variant form thereof to a contact lens having a relatively harder central portion and a softer hydrophilic peripheral skirt portion with identifying means incorporated directly into the lens.

In many instances the production, distribution and use of contact lenses and other types of polymeric structures will be improved by having a clearly distinguishable and permanent identifying means incorporated into the structure. Contact lenses marketed heretofore have not contained an identification means permanently located within the lens thus making identification of and evaluation of the lens difficult.

Soft lenses heretofore known are generally prescribed with companion lenses which are virtually indistinguishable from each other to the wearer. This presents the potential problems that a lens prescribed for the left eye may inadvertently be placed in the right eye and vice versa.

U.S. Pat. No. 3,034,403 shows the use of a dissimilar zone in the center of a contact lens for the sole purpose of effecting the light transmissibility of the lens. Use of such a dissimilar zone in a contact lens for identification purposes was not disclosed therein. Distinguishing between two lenses both having a dissimilar zone is often impracticable; this indistinguishability precludes the conclusion that such a dissimilar zone necessarily performs an identification function similar to the current invention.

SUMMARY OF THE INVENTION

It is an object of this invention to provide a means for identifying the nature of polymeric structures by molding into the polymeric structure strands, rods or fibers of suitable material thereby creating visually observable identifying means.

It is an additional object of this invention to provide a polymeric contact lens with means molded into the lens blank before machining.

It is a further object of this invention to provide a soft contact lens or a lens having an axial gradation of properties and which has an identifying means molded into the lens blank before machining remaining as an integral part of the finished contact lens.

The contact lens contemplated by this invention is a structure having a segment of one or more strands, rods or fibers or portions thereof incorporated therein as an identifying means. The identifying means is incorporated into a contact lens to provide various identifying functions. The identifying means may comprise colored or opaque elongated materials such as small diameter carbon rods, polymer or natural threads such as Dacron or nylon or small diameter rods made from colored or otherwise contrasting plastic resin. Any number of strands, rods or fibers may be arranged in particular orientations with each strand, rod or fiber possessing particular characteristics thereby providing classification of the polymeric structure. Where electrical or magnetic identification is desired, the strands, rods or fibers may possess various electrical or magnetic orientations and characteristics. The strands, rods or fibers must be compatible with the surrounding polymer structure and with the environement encountered in the eye so that neither are dissolved or significantly changed. The strands, rods or fibers must also be readily machinable, grindable and polishable. Where the identifying means are used in a contact lens, the strands, rods or fibers must be compatible with continued use in the eye. The identification means usually has a circular cross section, however other shapes may be used in order to permit a large range of lens property identification by visual inspection.

One specific use of the identifying means is in a composite contact lens having variations in properties such as hardness, color, density, water absorption, photochromicity, light transmittance, opacity, refractive index and pigmentation from one portion thereof to another portion thereof without residual stresses and distortions if a hydrophilic polymer is used. The peripheral skirt portion of a composite lens may be hydrophilic copolymer formed from a water soluble vinyl monomer copolymerized with a hydrophilic water insoluble monomer in the presence of a cross-linking agent and a quantity of water soluble inert substance. This inert substance is substantially removable by exposure of the polymer to water. Upon exposure to water, a substantial portion of the water soluble inert substance is removed from the polymer matrix and replaced by water to form the soft hydrophilic polymer structure desirable for use in contact lenses. Stresses and distortions of the shape of the lens are minimized or eliminated by simply exchanging the water soluble inert substance for water in the polymer matrix. The peripheral skirt portion or the central portion of the lens contains identifying means which appear as a small dot or several dots in the peripheral skirt portion of the lens after the lens has been machined and ground.

The central portion of a contact lens may have a different composition than other portions to provide a gradation in the physical characteristics of the lens. The central portion may be composed of a relatively harder polymer such as an extensively cross-linked copolymer of methoxyethyl methacrylate and hydroxyethyl methacrylate in combination with a cross-linking agent, the relative amounts of the constituents being chosen to give a greater hardness for the center section than the peripheral skirt.

The method of producing the composite contact lens of this invention is accomplished in one embodiment by polymerizing a central rod of the diameter of the intended central portion of the lens, for example, approximately 6 to 7 millimeters in diameter. For the central portion of the contact lens a polymer system is chosen which results in a relatively hard copolymerized structure. A compatible polymer system which will form a hydrophilic polymerized outer annular peripheral skirt portion having a lower degree of hardness is then polymerized about the outside of the central rod. A suitable water soluble inert substance which will not interfere with the polymerization is dissolved throughout the matrix of the polymerization system used to form the peripheral skirt portion of the composite rod. This water soluble inert substance is provided to eliminate or minimize the stresses and distortions resulting from hydration of the hydrophilic polymer upon exposure to water. An elongate identifying means is molded into the peripheral skirt portion of the rod extending substantially parallel to the axis of the composite rod so that lens blanks cut perpendicular to the axis of the composite polymeric rod will incorporate a short length of the identifying means. The lens blanks are then machined, ground and polished in an anhydrous environment to provide the optical correction desired. Exposure of the resulting lens to water hydrates the polymer and removes the water soluble inert substance.

Another method of producing the composite contact lens of this invention is to polymerize a rod of a size equal to the outside diameter of the lens, e.g. 14 mm., the polymerization mixture containing a water soluble inert substance and incorporating elongate identifying strands, rods or fibers in the rod near the periphery thereof. A hole is drilled at the center of this rod, of the size equal to the central portion of the lens, and a second polymerization mixture compatible with the outer material is poured in and polymerized. The resulting composite rod has a coaxial cylindrical configuration with the peripheral skirt portion having properties differing from the central rod and having identifying strands, rods or fibers extending the length of the composite rod. If a gradation of properties are desired, the process may be repeated as many times as desired, each successive drilling and filling operation using successively smaller diameter drills. The fill material used is a monomer mixture which will result in a polymeric structure having properties differing from the adjacent polymer structure. For example, the central portion may have a harder, non-hydrophilic polymer composition as compared to the peripheral skirt portion, or other physical properties of the polymers may be varied as desired. Alternately, the identification means may be polymerized into the central or other zones of the lens.

A contact lens manufactured with identifying means therein allows an optical practitioner or his patient to distinguish between a lens prescribed for the right eye and the left eye. Identifying means may also allow other classifications for contact lens which may be helpful to the manufacturer in production and distribution of the lenses. It may become advantageous in the future to incorporate into a lens identifying indicia which possess visually distinguishable characteristics for a patient's use whle also possessing visual, electrical or magnetic characteristics which can be used in automated identification systems.

The composite rod structure enables the skilled optical technician to fabricate contact lenses of many types by ordinary techniques in the anhydrous state. Special types of lenses may also be fabricated including cylinders, myodiscs, lenticulars, prisms, truncations and other special types of lenses which heretofore could be formed from the well-known hard methyl methacrylate type lens materials but which were difficult or impossible to fabricate from the soft hydrophilic type materials of the prior art. Residual astigmatism is corrected by virtue of the fact that the relatively harder center does not conform to the shape of the cornea but rather forms the exterior of the cornea into the desired shape. Identification of the nature and properties of the lens is facilitated by the presence of the identification means and the wearer may more easily determine which lens to place in each eye.

The current invention possesses the following attributes. The inclusion of identifying indicia which are molded into the lens eliminates the need to apply new identification means to a lens rendered unidentifiable by removal of the surface identification during polishing. The current invention also easily incorporates non-visual identification means such as electrical or magnetic classification systems which may become desirable in manufacturing processes. The current invention also provides a permanent and more easily distinguishable identification means than the prior art while being produced by incorporating the relatively inexpensive step of molding the identifying means directly into the polymeric structure during manufacture.

These and other objects and attributes of this invention will become more readily apparent from an evaluation of the following detailed description taken in conjunction with the attached drawings.

DESCRIPTION OF THE PREFERRED EMBODIMENT

Figure 1:
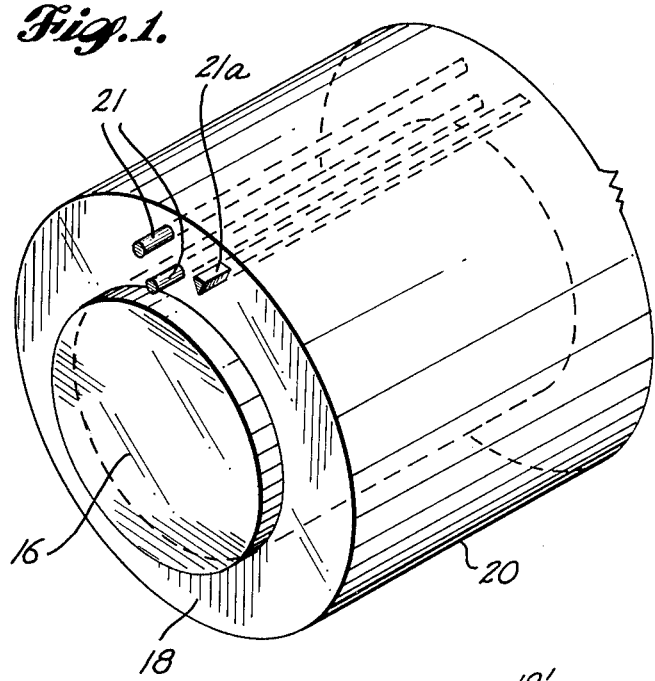
FIG. 1 is an enlarged partial isometric view of a composite rod from which lens blanks are to be cut. Three elongated strands are molded in the peripheral skirt portion of the composite rod as an identification means.

Referring to the drawings wherein like numerals indicate like parts, there is seen in FIG. 1 an isometric view of a composite polymeric rod 20 having a central rod 16, a peripheral skirt portion 18 and elongated identification strands 21.

Central rod 16 is substantially cylindrical and has a longitudinal axis A—A. Central rod 16 is composed of a relatively hard polymeric material such as polymethyl methacrylate or similar optically suitable material. For example, the inventors have used methoxyethyl methacrylate and hydroxyethyl methacrylate cross-linked with 1,5-divinyloxy-3-oxapentane as a cross-linking agent with azobisisobutyronitrile (AIBN) as catalyst with excellent results.

Peripheral skirt portion 18 comprises a hollow cylinder, the inside diameter being coincident with the outside diameter of central rod 16. Peripheral skirt portion 18 is continuous along the entire length of composite rod 20. Peripheral skirt portion 18 may be composed of a relatively softer hydrophilic copolymer polymerized from a mixture such as methoxyethyl methacrylate and hydroxyethyl methacrylate with 1,5-divinyloxy-3-oxapentane in the presence of AIBN as a catalyst and containing a water soluble inert substance such as polyoxyethylene glycol.

Elongated identification means 21 and 21a may be any number of colored or opaque materials such as a small carbon rod, a polymerized thread such as Dacron or nylon or any rod made from a colored plastic resin having a circular cross section as shown in 21 or other cross sectional shapes such as the triangular cross section of identification means 21a.

The identification means 21 must be compatible with the particular polymer used to form peripheral skirt portion 18. Identification means 21 must also be suitable for contact with the eye and easily ground and polished to form a continuous and smooth surface across the contact lens.

Figure 2:
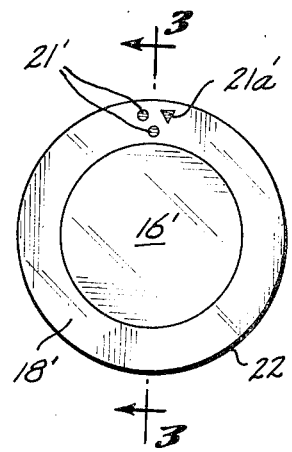
FIG. 2 is a plan view of one face of a blank cut from the composite rod of FIG. 1 having the identification means in the peripheral skirt.
Figure 3:
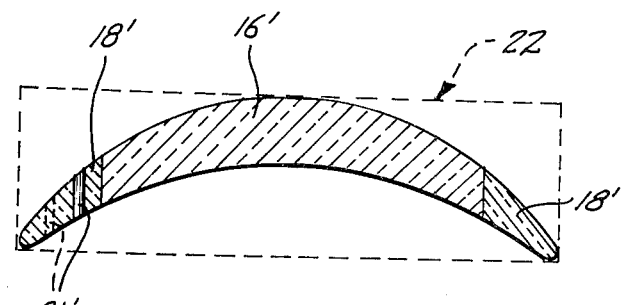
FIG. 3 is a cross section view of the finished contact lens formed from the blank of FIG. 2 with phantom lines indicating the blank from which the finished lens was ground.

Composite rod 20 is formed by positioning central rod 16 concentrically within a cylindrical mold of the proper dimensions. Also positioned within the mold substantially parallel to longitudinal axis A—A of central rod 16 are one or more identification means 21. Any number of identification means having varying properties may be so located within the mold at varying positions. A suitable monomer or mixture monomers are then polymerized within the mold. After the composite rod 20 has polymerized for a sufficint time at the proper temperature, the anhydrous polymer composite rod 20 is removed from the mold, machined to the proper outside diameter and cut into contact lens blanks 22, FIG. 2, from which contact lenses shown in FIG. 3 are ground.

Similar segments of all identification means 21 and 21a are present in each contact lens blank 22 and contact lens produced from a given composite rod 20, thereby allowing classification of all contact lens blanks 22 and contact lenses according to the identifying indicia 21' and 21a' present in each.

Figure 4:
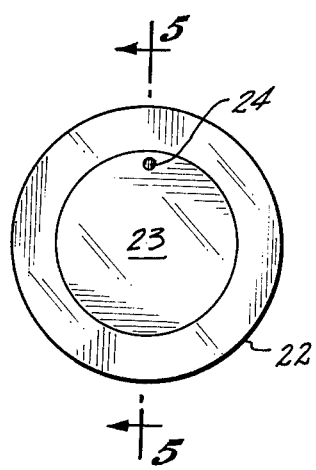
FIG. 4 is a view similar to FIG. 2 with the identification means positioned in the central portion of the lens.
Figure 5:
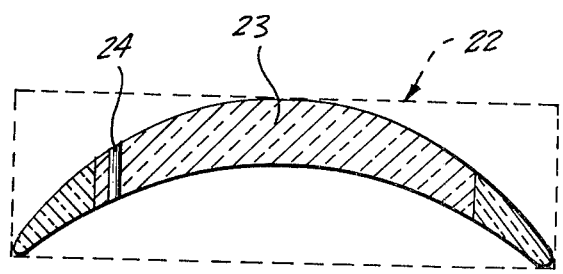
FIG. 5 is a cross section view of another finished contact lens formed from the blank of FIG. 4.

FIG. 4 depicts the contact lens blank 22 having identification means 24 located in a central area 23 of the blank. FIG. 5 shows a contact lens ground from the blank of FIG. 4 and having the corresponding location of the identification means 24.

A contact lens produced in accordance with the invention has properties of hydrophilicity and hardness which vary from the central portion 16' to the outer portion 18' without inducing stresses and distortions upon hydration by the inclusion of a water soluble inert substance such as polyoxyethylene glycol added to the monomer mixture prior to polymerization. Aqueous extraction of this substance during the hydration step of the hydrophilic polymer decreases or eliminates stresses and distortions of the polymeric shape.

EXAMPLE

A 7 mm. central rod comprising a cross-linked copolymer of methoxyethyl methacrylate (40%) and hydroxyethyl methacrylate (58%) cros-linked with 2% of 1,5-divinyloxy-3-oxapentane as a cross-linking agent copolymerized with AIBN as catalyst was polymerized. The central rod was then positioned coaxially within a cylindrical mold. An elongated identification means consisting of a carbon rod approximately 0.5 mm. in diameter was positioned adjacent the central rod within the mold oriented substantially parallel to the axis of the central rod and the mold. A mixture of 30% polyoxyethylene glycol, 15.5% methoxyethyl methacrylate and 52.4% hydroxyethyl methacrylate with 2% of 1,5-divinyloxy-3-oxapentane with the presence of 0.1% AIBN as a catalyst was copolymerized around the previously formed polymer central rod and the carbon rod. The mixture was polymerized at 40 degrees C. for 30 hours and was subsequently cured at 60 degrees C. for 10 hours. The composite rod was turned down to a diameter of 14 mm. and cut into cylindrical contact lens blanks from which contact lenses were fabricated. Upon hydration, a hard-soft lens resulted with no distortion of the radii of curvature as ground prior to hydration. The lenses have a central portion to peripheral skirt portion hardness ratio of 2:1. The carbon rod segment used as the identification means extended through the lens substantially parallel to the optical axis of the lens and was clearly visible upon inspection.

The composite polymeric prosthetic devices made possible by this invention have been described specifically by way of the example of a soft contact lens having two zones of differing hardness. Special application types of contact lenses such as are used as a means for applying medication may readily be fabricated according to the teachings of this invention. Scleral contact lenses, corneal contact lenses, microlenses and special correction lenses such as those containing an artificial iris, central or peripheral opacity, lenses used in cases of albinism, atrophy of the eye or other conditions can all be constructed according to this invention.

Many modifications to the methods and devices disclosed herein will be readily apparent to those skilled in the arts of polymer chemistry, opthalmology and related arts and sciences in view of the invention disclosed herein and through an understanding of the appended claims.

We claim:
1. A polymeric contact lens blank structure comprising a substantially cylindrical button having at least one identification means positioned therein, said means being compatible with the polymer system forming said button and being machinable along with said button to form a contact lens said means being spaced inwardly from the peripheral edge of said button and extending through the entire thickness thereof in a direction sustantially parallel to its axis.

2. The lens blank structure of claim 1 further comprising at least a center zone and a radially disposed peripheral zone, said identifying means being located in said peripheral zone.

3. The lens blank structure of claim 1 wherein said identification means comprises at least one elongated element positioned substantially parallel to the axis of said cylindrical button.

4. The lens blank structure of claim 1 wherein said identification means is substantially circular in cross section.

5. The invention of claim 1 wherein said lens blank structure is formed by cutting segments transversely from a composite rod.

6. A contact lens ground and polished from the lens blank of claim 1.

7. A contact lens ground and polished from the lens blank of claim 2.

8. A contact lens ground and polished from the lens blank of claim 3.

9. A method of making a composite contact lens having identification means therein comprising the steps of:

Polymerizing elongate substantially cylindrical rod from a first monomer mixture having a first set of properties and a central axis;

Polymerizing a cylindrical coating of a second monomer mixture about said elongate rod, said cylindrical coating having a second set of properties and containing an elongated identification means therein being spaced inwardly from the peripheral edge of said cylindrical coating and extending through the entire length thereof in a direction substantially parallel to said axis to form a composite rod;

Cutting transverse segments of said composite rod to form contact lens blanks having opposed surfaces substantially perpendicular to said axis;

Grinding and polishing said contact lens blanks to form contact lenses having a central zone and a peripheral skirt portion, said peripheral skirt portion containing at least one segment of said elongated identification means.

10. The method of claim 9 wherein the first and second monomer mixtures include hydrophilic polymers, the method further comprising the step of dissolving a water soluble inert substance in each of said monomer mixtures in approximate volumetric equivalence to the anticipated amount of water uptake of said hydrophilic polymers and the step of hydrating the composite contact lenses to substitute water for the water soluble inert substances to yield hydrated composite lenses.

11. A method of manufacturing contact lenses having a gradation of properties from the central portion thereof to the peripheral skirt portion thereof and containing identification means in said peripheral skirt portion comprising the steps of:

forming a central rod from a first polymeric material having a first set of properties;

polymerizing at least one layer of a second polymeric material about said central rod, said second polymeric material having a second set of properties differing from said first set of properties, including being relatively softer than said central rod and comprising a water swellable, hydrophilic polymer compatible with said central rod, said one layer containing a water soluble, solid, inert substance dispersed therein and further including at least one identification means comprising an elongated element positioned substantially parallel to said central rod;

cutting transverse sections from said composite polymeric rod to form lens blanks;

grinding and polishing said lens blanks into a contact lens; and thereafter hydrating said lens to remove said water soluble, solid, inert substance and substitute water therefore to yield a hydrated composite lens relatively free of stress and distortion after hydration and containing a segment of said identificiation means.

* * * * *